3,436,040
AUTOROTATIVE RECOVERY SYSTEM
Jan M. Drees, Dallas, Tex., assignor to Bell Aerospace
Corporation, Wheatfield, N.Y.
Filed Mar. 2, 1966, Ser. No. 531,300
Int. Cl. B64g 1/00; B64c 27/00
U.S. Cl. 244—138       4 Claims

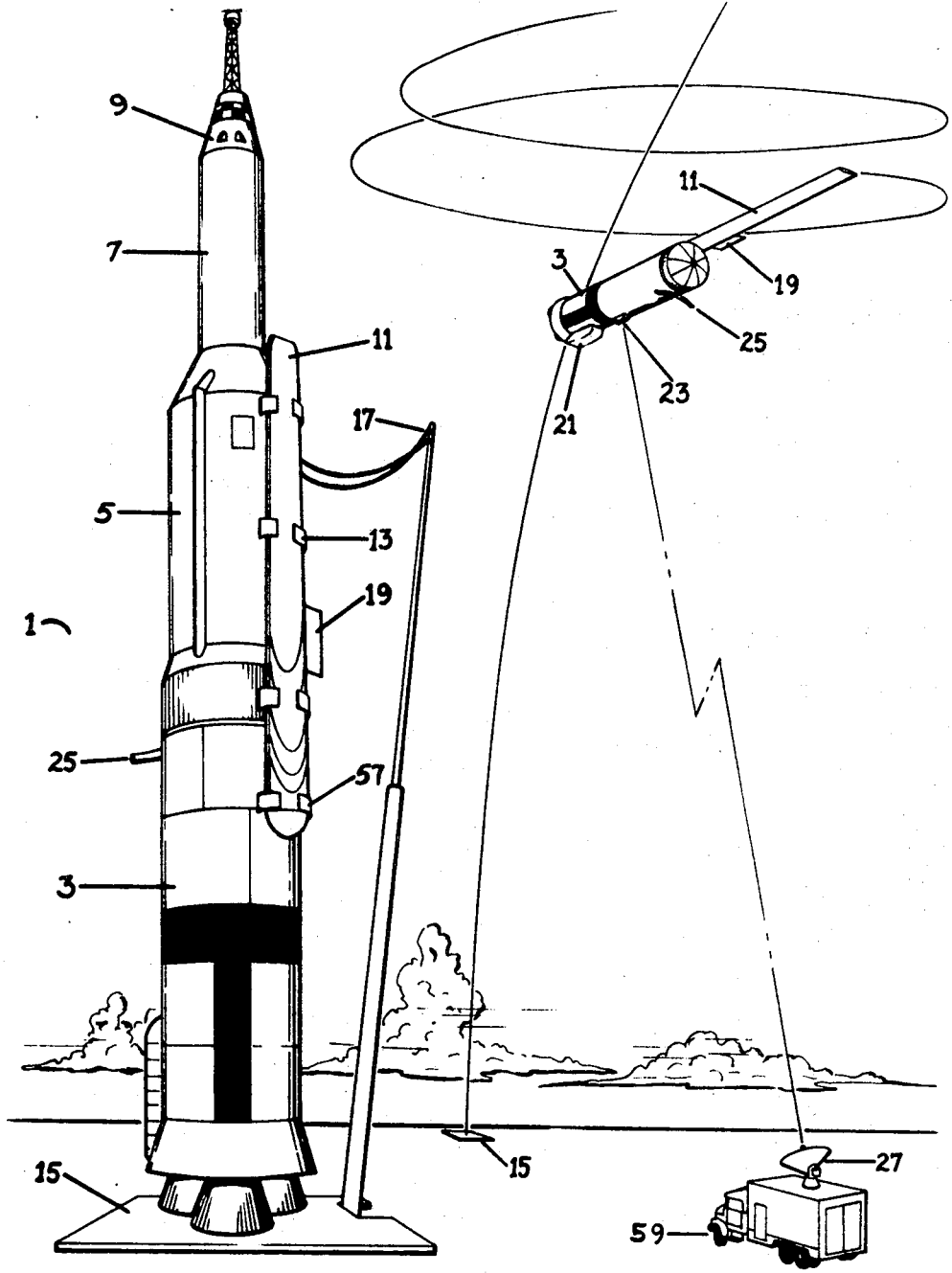

ABSTRACT OF THE DISCLOSURE

Rocket or the like is provided with self-rotative descent capabilities by adjoining and extending a rotor blade section therefrom which provides lift as assembly of rocket and blade rotate around center of gravity of assembly.

---

This invention relates to rotative wing means and, in particular, to means for providing recoverable objects with rotative or self-rotative descent capabilities to enable them to descend in controlled flight from a point above the earth to the ground.

The advent of space travel has brought about the use of extremely expensive components such as the lower stage rockets of space vehicles, these expensive units being presently available for use only once. The rocket is carried into space for a prescribed distance supplying the propulsive power for the vehicle and then, after its propulsive force has been expended, or at such time as may be desired, it is detached from the remainder of the vehicle (the upper stage rockets and the nose cone) which continue on their journay. If the rocket is permitted to fall to earth and crash, this results in the destruction of an extremely expensive and hard-to-replace components whereas if it could be brought back to earth in controlled fashion with a minimum of damage, it could be effectively reused with considerable savings.

Several means have heretofore been considered to effect the controlled descent of objects such as a lower stage rocket, among them the obvious parachute attached to the body of the rocket and arranged to open subsequent to detachment from the upper stage rockets and nose cone. Another suggested device has been that of a conventional autorotaing rotor similarly arranged to open upon detachment from the upper stage rockets.

Important considerations affecting the successful use of any such descent regulating device include:

(1) The capability of such a device to adequately retard descent,
(2) Its capability to directionally control descent, and
(3) Its additional weight and complexity.

A parachute is not effective for directional control and, additionally, must be of an impractical size to provide a sufficiently slow rate of descent while a conventional, autorotating rotor would be relatively heavy and complex. As the amount of payload that can be orbited into space is a function of the power to weight ratio of the entire space vehicle including the rockets and the recovery system, and as power is always limited, the weight of the recovery system assumes a high degree of importance.

It is an object of the present invention to provide a relatively light and simple autorotative recovery system capable of directing an expended rocket or the like to a soft landing in a prescribed area.

Another object is to provide an autorotative recovery device capable of controlled translation and directional control.

Another object is to provide a recovery device that is capable of landing objects dropped from high altitudes in a controlled manner without substantial damage thereto.

Yet an additional object is to provide a practical single bladed autorotative recovery device.

Yet another object is to provide a combinative autorotative recovery system employing both a blade and the object of the recovery system as integral portions thereof.

FIG. 1 illustrates one embodiment of the invention as applied to a space vehicle assembly.

FIG. 2 shows a rocket descending in autorotation with ground control provided through a ground control system.

Figure 3:
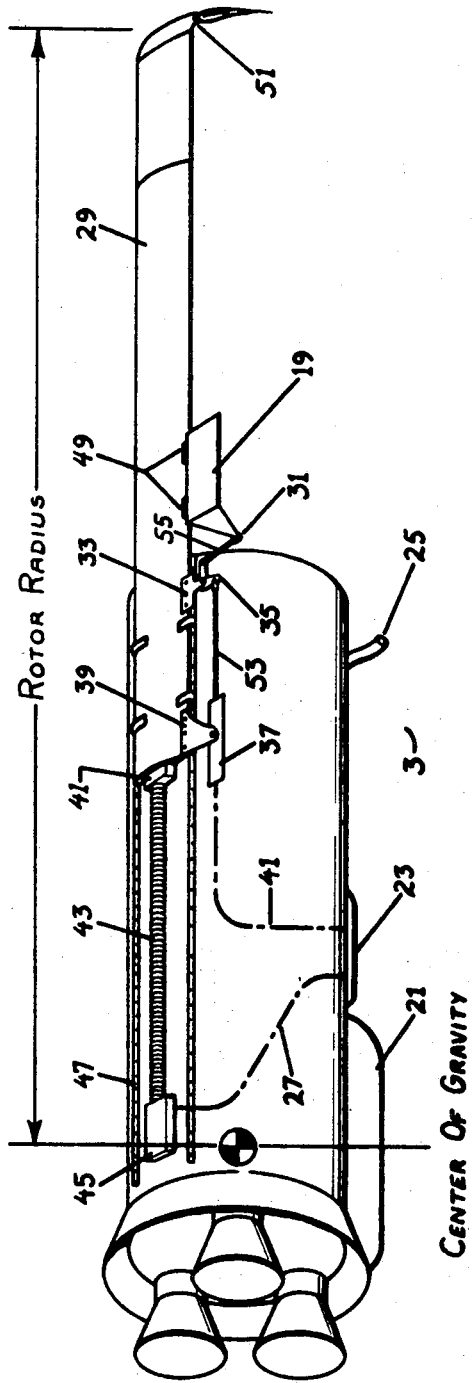
FIG. 3 shows another embodiment of the invention as applied to the rocket of a space vehicle assembly.

Referring to FIG. 1, the space vehicle assembly 1 is positioned on landing pad 15 preparatory to launching with the gantry 17 attached thereto. The vehicle comprises a first stage rocket 3, second and third stage rockets 5 and 7 respectively and nose cone 9.

A rotor blade 11 is fixedly connected to the first stage rocket 3 by clamps 57 and extends adjacent second stage rocket 5 to which it is attached by clamps 13. Clamps 13 are adapted to release rotor blade 11 from the second stage rocket 5 simultaneously upon detachment of the first stage rocket 3 from the second stage rocket 5, whereas clamps 57 permanently connect the rotor blade to the first stage rocket 3.

Flap 19 attaches to the trailing edge of blade 11 and is preset at an appropriate pitch angle with respect to the main blade section so as to initiate rotation of the rocket and blade and induce autorotation (self-rotation), the aerodynamic phenomenon by which nonpowered rotary wing aircraft are able to descend safely to the ground, as upon failure of the engine. Tests have shown that the spanwise and pitch angle disposition of the flap 19 on the blade 11 is instrumental in initiation of rotation; the most effective location and angle dependent upon the particular arrangement.

Note that the rotor blade 11 is extended away from that end of the booster 3 which includes its center of gravity (also see FIG. 3). As a freely rotating body will rotate around its own center of gravity, this disposition of the blade 11 means that its lifting surface will be displaced a maximum amount from the center of rotation of the assembly, assuring a large effective rotor diameter for the particular rocket and blade.

It is to be expected that part of the rocket and the blade will be damaged even upon a relatively soft landing, but the expensive rocket engine and pumps can be saved so as to be reusable. Protection of these parts can be increased by attaching an inflated rubber bag 21 to the rocket (FIG. 2), and a skid gear type of landing gear 25 may also be attached for the purpose of further cushioning the landing.

FIG. 3 illustrates another embodiment of the invention wherein the rotor blade 29 is initially in a retracted position on tracks 47 and is maintained in this position until the first stage rocket 3 is detached in flight from the second stage rocket 5, probably in the stratosphere, in accord with the flight plan. At this time an actuating device, motor 45, upon a signal through wire 27 emanating from the radar 27 of ground station 59 to control box 23 (see FIG. 2), is energized to drive the screw 43, which extends into nut 41 attached to the blade 29, so that the blade is moved along tracks 47 to its extended position as shown.

Flap 19 is attached to blade 29 by hinges 49. Pitch control arm 31 is connected to flap 19 and is attached to control actuator 37 through rod 55, bellcrank 35 and rod 53. Actuator 37 is pivotally attached to blade lug 39, as is bellcrank 35 to blade lug 33. Thus, when energized, actuator 37 can impart a change of pitch to flap 19 and for that purpose is electrically attached by wire 41 to the control box 23.

Cyclic pitch commands to flap 19 from the ground control station 59 through control box 23 can effect directional control of the booster/blade assembly so as to position it over a predetermined area, while collective pitch commands impressed upon flap 19 at a small distance above the ground can reduce the sink rate to almost zero for touch-down purposes.

A vernier rocket, or a tip jet 51 (shown in FIG. 3) employing available rocket fuel, can be used to initiate and assist rotation of the blade and rocket, thus providing a powered flight capability enabling, at least to some degree, the "flying" of the assembly to an area that would be beyond the reach of autorotational flight.

In place of the rotor 45 and screw 43, a pressure-sensitive spring could be employed to extetnd the blade upon attainment of the proper altitude and rotation of the booster and blade assembly, once initiated, will produce a centrifugal force that can then be employed to further extend the blade.

Considering a presently operational rocket with dimensions of 130 feet length, 33 feet diameter and 250,000 pounds empty weight, it has been calculated that a rotor blade 130 feet long with a chord of 15 inches could provide such a rocket with an effective single blade rotor diameter of approximately 300 feet and a steady rate descent capability of approximately 30 feet per second at a rotational speed of ½ revolution per second. Typical calculations show that low rotor disc loadings in the order of 1.5 to 2 pounds per feet squared will be attained. As previously noted, the rate of descent could be appreciably reduced by means of collective pitch adjustments of the flap 19 immediately prior to touchdown while application of cyclic pitch, in addition to directing the booster to a prescribed landing area, can be used to cause a reduction in rate of descent by virtue of effecting translational speed, in accord with well known rotary wing principles.

While the configurations herein described and illustrated employ a rocket, it is clear that application of the present invention need not be restricted thereto but can involve any object which it is desired to effect a rotative or autorotative recovery thereof.

I claim:
1. A rotor recovery system adapted for use on a recoverable object comprising:
    (a) a substantially rigid rotor blade adjacent to said recoverable object,
    (b) extension means operatively associated with said rotor blade and said recoverable object, and
    (c) guide means attached to said recoverable object and defining a path of motion of said rotor blade substantially parallel to the longitudinal axis of said object, whereby actuation of the extension means causes the rotor blade to assume a position in extension of the recoverable object to provide for autorotative capability of the rotor blade and recoverable object as a unit.
2. The device described in claim 1, said guide means comprising tracks.
3. The device set forth in claim 1, said extension means comprising an actuating device.
4. A space vehicle comprising:
    (a) a lower stage rocket,
    (b) an upper stage rocket detachably connected to said lower stage rocket,
    (c) a nose cone attached to said upper stage rocket,
    (d) a rotor blade axially disposed adjacent said lower stage rocket and
    (e) an extension means connected to said lower stage rocket and said rotor blade,
    (f) said extension means constructed and arranged to position said blade further beyond the terminal portion of said lower stage rocket substantially parallel to the longitudinal axis thereof when said lower stage rocket is detached in flight from said upper stage rocket.

References Cited
UNITED STATES PATENTS

| | | | |
|---|---|---|---|
| 2,450,992 | 10/1948 | Sanderson | 244—138.1 |
| 2,487,465 | 11/1949 | Murray | 244—43 |
| 2,654,320 | 10/1953 | Schmid | 244—138 |
| 3,117,744 | 1/1964 | Roman | 244—138 |
| 3,215,370 | 11/1965 | Strydon | 244—17.11 |

MILTON BUCHLER, *Primary Examiner.*

R. A. DORNON, *Assistant Examiner.*

U.S. Cl. X.R.

46—74; 170—159.1